US006552698B1

(12) United States Patent
Walker et al.

(10) Patent No.: US 6,552,698 B1
(45) Date of Patent: Apr. 22, 2003

(54) IMMERSIVE DISPLAY SYSTEM

(75) Inventors: Richard C. Walker, Palo Alto, CA (US); Pierre H. Mertz, Mountain View, CA (US); Barclay J. Tullis, Palo Alto, CA (US)

(73) Assignees: Agilent Technologies, Inc., Palo Alto, CA (US); Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/563,182

(22) Filed: May 2, 2000

(51) Int. Cl.[7] .............................................. G09G 5/00
(52) U.S. Cl. .............................................. 345/7; 345/8
(58) Field of Search ........................ 345/7, 8, 9; 349/11; 359/630; 348/51, 53, 54

(56) References Cited

U.S. PATENT DOCUMENTS

| 4,446,480 A | | 5/1984 | Breglia et al. ............... 358/104 |
| 5,424,556 A | * | 6/1995 | Symosek et al. ............... 345/8 |
| 5,684,498 A | * | 11/1997 | Welch et al. ............... 345/8 |
| 5,812,257 A | * | 9/1998 | Teitel et al. ............... 345/8 |
| 5,850,201 A | * | 12/1998 | Lasko-Harvill et al. ......... 345/8 |

FOREIGN PATENT DOCUMENTS

WO    WO 96/07947    3/1996    ........... G02B/27/01

OTHER PUBLICATIONS

M.D. Stephenson, "A Helmet–Mounted Sight Using C.C.D. Technology", The Radio End Electronic Engineering, vol. 49, No. 10, Oct. 1979, pp. 511–513.
L. Russo, "Helmet Mounted Visually Coupled System" Proceedings of the SID, vol. 19, No. 4, 1978, pp. 181–185.

* cited by examiner

Primary Examiner—Xiao Wu

(57) ABSTRACT

An immersive display system which provides for an optical correlator for imaging a surface and generating data representative of the position or movement of the optical correlator and any object physically associated with the optical correlator. Imagery is generated and displayed on a display device in accordance with the data generated by the optical correlator.

12 Claims, 5 Drawing Sheets

IMMERSIVE DISPLAY SYSTEM

FIELD OF THE INVENTION

The present invention relates to an immersive display system. More particularly, the present invention relates to an immersive display system that incorporates an optical correlator for imaging surrounding features within an environment and determining the relative position of a user's head within the environment as to display imagery on a visual display relative to the position of the user's head within the display environment.

BACKGROUND OF THE INVENTION

Simulation systems are known which attempt to provide a user with a realistic simulation of being in a predefined environment, such as, for example, on a golf course or in the cockpit of an airplane. This is accomplished by providing the user with appropriate visual cues, or images. For greatest effect images are provided to the user so as to provide for substantially all visually perceptible sensory input to the user. These systems are useful for providing the user with the simulated experience of being in another environment.

Known systems provide for a display device which is typically supported by a user in very close proximity to the user's eyes so as to dominate the visual input received by the user's eyes. In order to provide for a realistic illusion of being in a different environment, known systems have provided for images or scenes shown on the display device to be changed, or modified by a connected image generator in accordance with changes in the position of a user's head. As an example, a user could experience standing on a golf course ready to tee-off. As the user maintains a forward head position, the user is, for example, presented with an image or scenes of a fairway leading up to a green on the golf course. As the user turns his/her head, the position of the user's head changes with relation to the environment and thus the connected image generator changes the images presented to the user on the display to give the user the illusion of turning his/her head while standing at the tee. For example, the user might be presented with images of fellow golfers standing to his/her left or right.

In order to provide the user with a realistic visual perception, known systems have used accelerometers to measure the changes in a user's head motion to calculate the position of the user's head. These systems suffer from inaccuracies due to the drift in head location estimates. Although these inaccuracies can be partially compensated for by introducing a high-pass function of the head position estimate and biasing any drift toward a steady state "head-upright forward facing" condition, such compensation is useful only if the user's head position makes short deviations from a forward facing heads up condition. Otherwise, in situations such as where a user is not seated or is free-roaming, errors are introduced which cannot be easily compensated for.

SUMMARY OF THE INVENTION

The present invention provides for an immersive display system which incorporates an optical correlator for imaging a surrounding environment to allow for determining the location and angle of a user's head relative to features and objects in the surrounding environment. There is also provided a display device for displaying imagery relative to the location and angle of the user's head in the environment in response to a position output signal generated by the optical correlator.

The method of the present invention provides for generating a position signal by optical correlation between signals that represent images of an environment. A relative position relating to a user is determined based upon the position signal. Imagery is generated for display in accordance with the determined relative position, and is displayed for viewing by the user.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
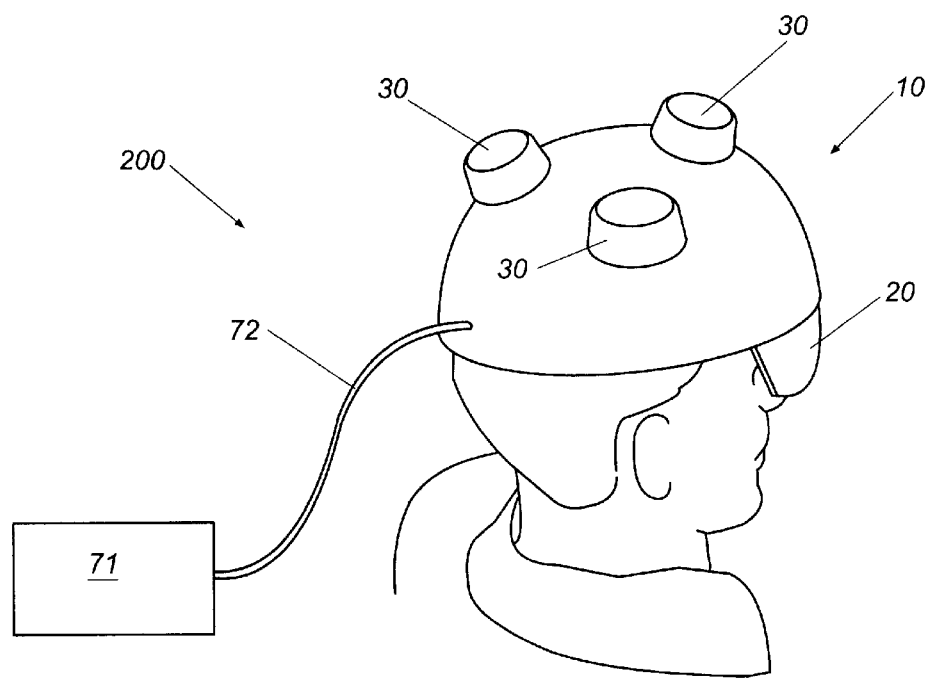
FIG. 1 illustrates the present invention.

With reference to FIG. 1, the present invention provides an immersive display system in which an environment 200 is provided. Objects and features in the environment 200 are imaged by at least one of optical correlators 30 to determine the position and angle of a user's head relative to surrounding objects and features in environment 200.

Environment 200 may be any static environment that provides optical contrast when imaged. As an example, the interior of a home could be the environment 200. In this case, the ceiling, floor, walls, furniture and other contents and features in the home could be imaged by the optical correlators 30 to determine the position and angle of a user's head relative to surrounding objects, structures and features in environment 200. As a further example, environment 200 can be defined by the surrounding features and structures, including buildings, trees, the sky, ground and other features that might exist outdoors. In short, environment 200 may be defined by almost any static environment in which a user of the present invention may be located. Imaging the environment 200 by optical correlators 30 is described below with reference to an environment defined by an enclosure 100. It will be recognized that the following description is also fully applicable to the embodiment of the invention shown in FIG. 1 that lacks such an enclosure. It will also be recognized that when the invention is used in an environment that lacks an enclosure, and the objects, structures and features of the environment can differ substantially in distance from the user, the optical correlators 30 should additionally include a range finder to enable the detected displacement of the image to be translated into an angular displacement.

Figure 2:
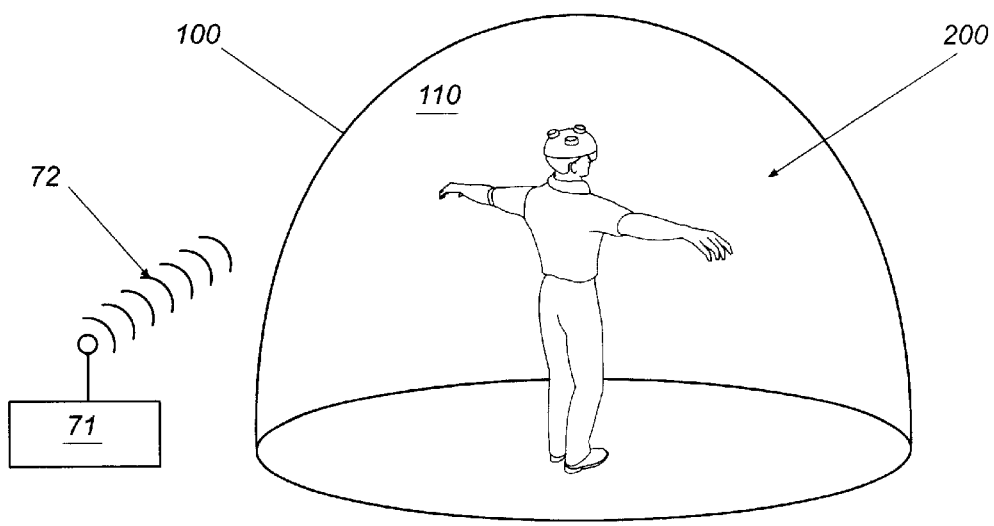
FIG. 2 illustrates the present invention in respect to an environment.

FIG. 2 illustrates another embodiment of the present invention in which an enclosure defines the boundary of an environment 200. In this embodiment, an enclosure 100 is used to define the environment 200. Enclosure 100 has an interior surface 110 area that is preferably patterned, or textured. Alternatively, an image may be projected onto the interior surface 100. The pattern, texture or image preferably has a high contrast. Although the enclosure 100 may be of any shape or size, a preferred embodiment has a hemispheric or globe-like shape and the user's head is preferably located at or near its center.

Figure 3:
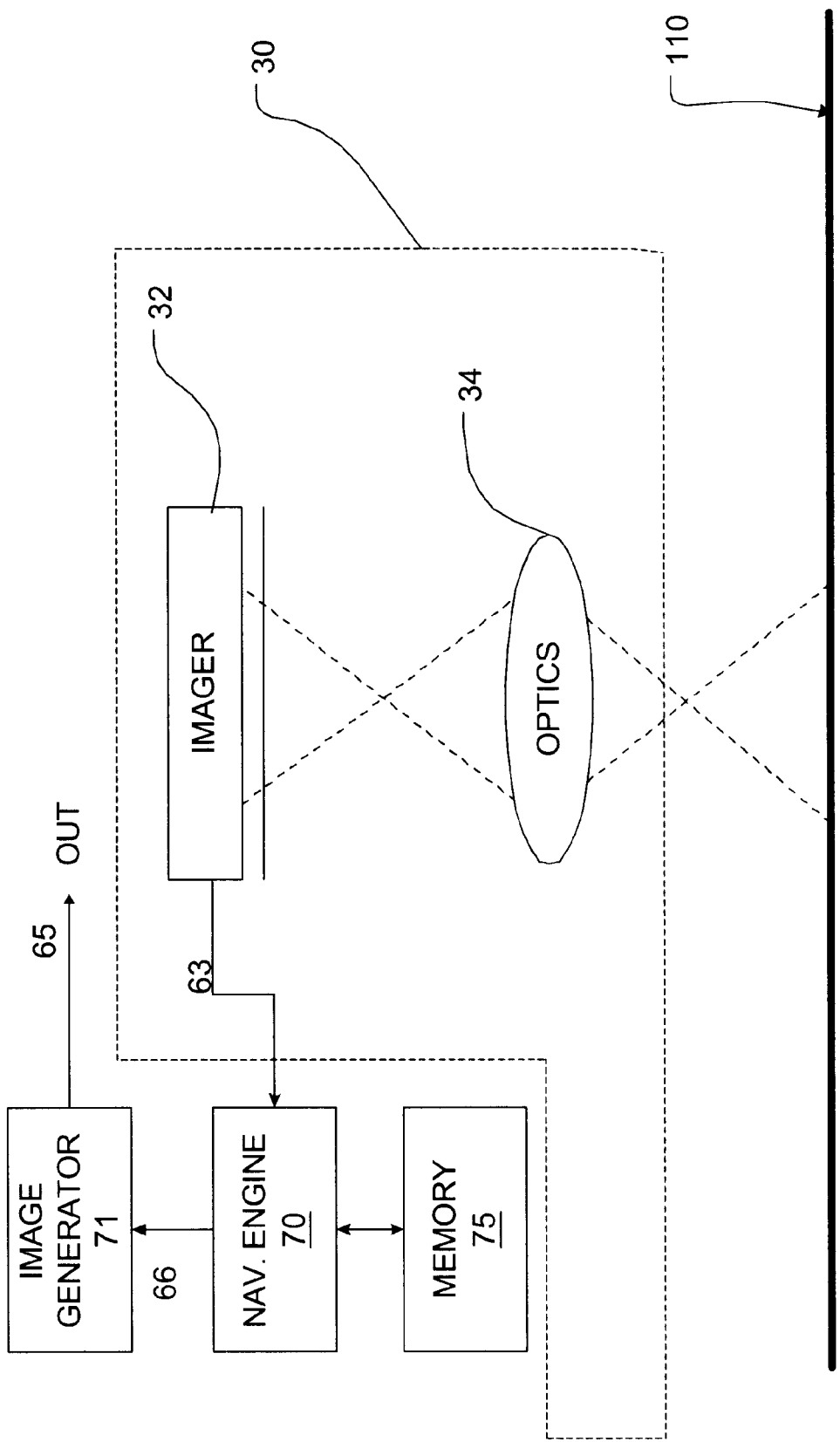
FIG. 3 illustrates an optical correlator.

With reference to FIG. 1, FIG. 2 and FIG. 3, the present invention provides a display unit 10 that incorporates optical correlators 30 that determine the position and angle of a user's head relative to surrounding objects and features in environment 200. Display unit 10 also includes visual display 20.

FIG. 3 shows optical correlator 30 that incorporates an imager 32 and an optical system 34 for focusing light on to imager 32. Imager 32 is preferably a complementary metal-oxide-semiconductor (CMOS) photo imager. However, other imaging devices such as a charge-coupled device (CCD), an amorphous silicon photo sensor array or any other photo diode array or photo transistor array may also be used.

Light from interior surface 110 is concentrated onto imager 32 by optical system 34. Imager 32 repetitively generates an imaging signal 63, or snapshot signal, that represents the portion of the interior surface 110 of enclosure 100 that is currently being monitored, or imaged by imager 32. The rate at which the imaging signal 63 is generated, and the duration of the exposure represented by each instance of the imaging signal can be determined dynamically to optimize one or both of the navigation accuracy and the signal-to-noise ratio of the imaging signal. The imaging signal 63 is delivered to a navigation engine 70 and may be stored into memory 75.

Navigation engine 70 generates positional signal 66 and outputs it to image generator 71. Image generator 71 subsequently generates an output signal 65 for display on visual display 20, given the relative position and angle of the user's head relative to the environment 200 as represented by positional signal 66. In a preferred embodiment, display unit 10 is equipped with three optical correlators 30. Each of the a optical correlators individually images interior surface 110 and provides an averaged or best-of-many output to navigation engine 70.

It should be noted that navigation engine 70, and memory 75, can be configured as an integral part of display unit 10. Further, navigation engine 70 could be implemented as, for example, but not limited to, a dedicated digital signal processor (DSP); an application specific integrated circuit (ASIC) or a combination of logic gates. Positional signals generated by imager 32 can be transferred to navigation engine 70 via either a cable interface or a wireless transmission system. The wireless transmission system could be, for example, optical or radio frequency. Further, positional signal 66 can be provided to image generator 71 via an interface 72. Interface 72 can be, for example, either a cable interface or a wireless transmission system. Examples of wireless interface systems are an optical transmitter/receiver systems or radio frequency transmitter/receiver.

As for visual display 20, it will be recognized that visual display 20 may be implemented in a variety of display means, including, for example, cathode ray tube, liquid crystal display or holographic display.

Figure 4:
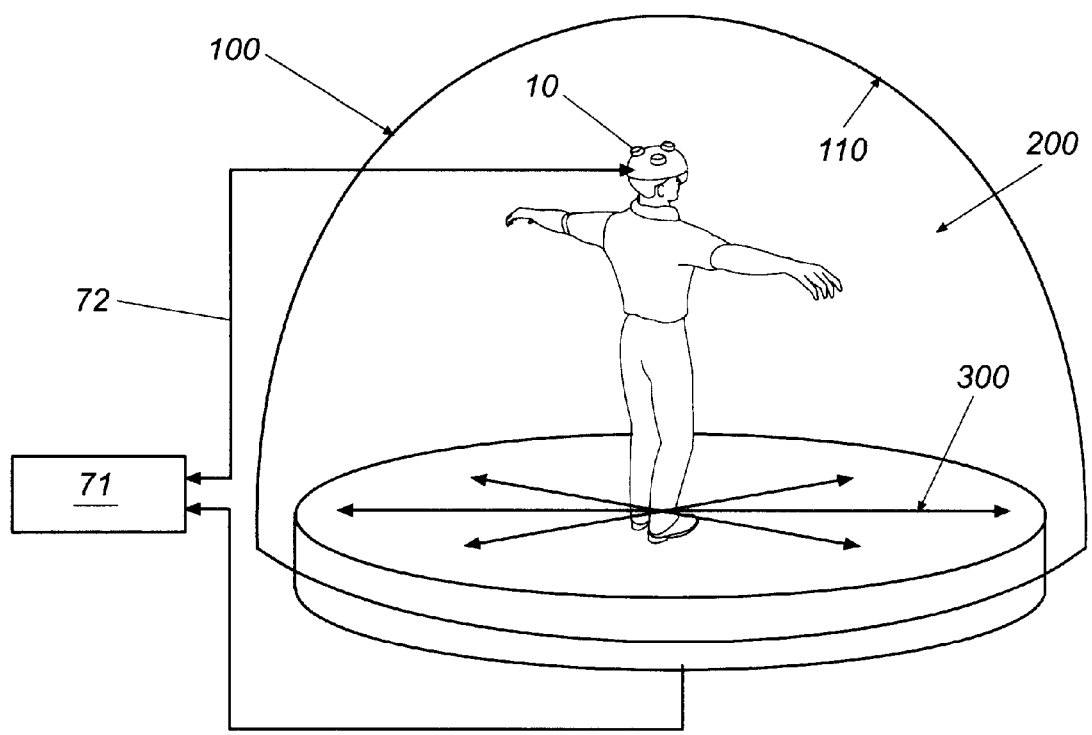
FIG. 4 illustrates an alternative embodiment of the present invention.

In FIG. 4, which illustrates another aspect of the present invention, there is provided an omni-directional treadmill 300 that allows a user apparently to walk in any direction without actually leaving the environment 200. As the user walks, image generator 71 receives an input signal from omni-directional treadmill 300. The input signal is used to determine the imagery to be generated by image generator 71 for display on visual display 20. The input signal from omni-directional treadmill 300 could represent the speed or direction of the omni-directional treadmill 300, where speed and direction of the omni-directional treadmill 300 are influenced by the movement or footsteps of a user on the omni-directional treadmill 300. This input could be used to provide motion information related to the user, such as relative speed and directional information, to the image generator 71. In turn, image generator 71 can adjust or change the imagery displayed on visual display 20 in accordance with the input signal from omni-directional 300. For example, if the signal from omni-directional treadmill 300 indicates the user's speed is increasing, image generator 71 could, for example, cause imagery to be displayed on visual display 20 faster to give the user a view consistent with walking faster or running within the scene displayed on visual display 20. Motion information could alternatively be provided by a pedometer instead of the omni-directional treadmill 300. This way of generating motion information would require that the user's maximum excursion from the center of the enclosure 100 be limited to a distance that is small compared with the radius of the enclosure 100.

Figure 5:
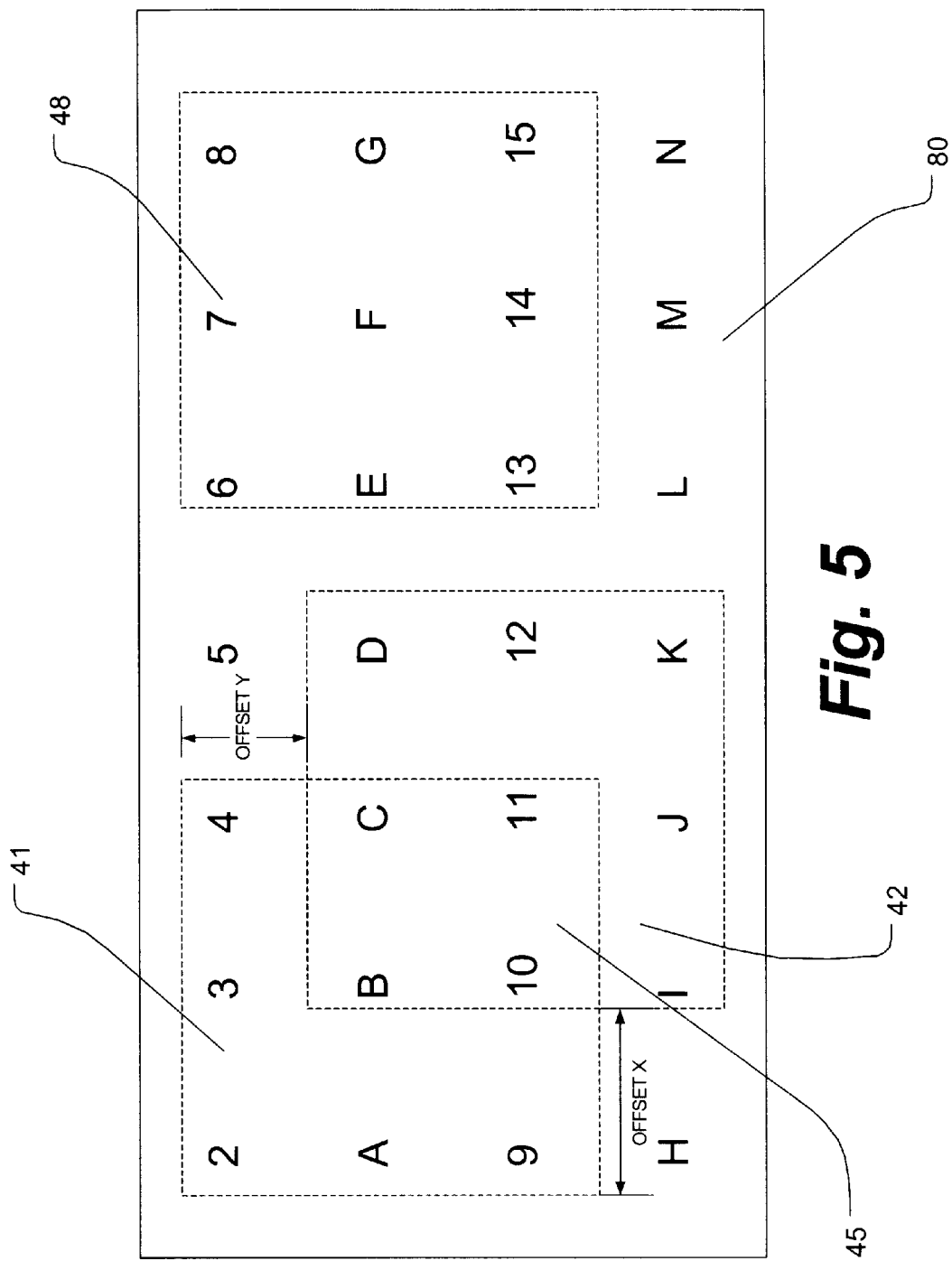
FIG. 5 illustrates an interior surface having a distinct surface characteristic.

FIG. 5 shows an interior surface 110 of enclosure 100, which has a distinct surface characteristic, or pattern. In this example, the pattern is represented by alpha-numeric characters to ease explanation, as the alpha-numeric characters are more easily distinguishable for purposes of discussion. However, such alpha-numeric characters could in fact be used as an effective surface pattern for interior surface 10 as contemplated by the present invention.

With reference to FIG. 5, there is shown a first, or reference snapshot (REF) 41; a second, or comparison snapshot (CMP) 42; and an area of commonality 45. Each snapshot, REF 41 and CMP 42, represents a predetermined area, for example, an area 300 mm×300 mm.

During the use of display unit 10 in an environment 200, imager 32 obtains a first snapshot (image) of the interior surface 110 of enclosure 100 as a reference snapshot (REF). This reference-snapshot data (REF) is stored into memory 75. After a fixed amount of time, a second snapshot of the interior surface 110 of enclosure 100 is obtained by the imager 32 as comparison (CMP) snapshot 42. Data representing CMP 42 is then compared by navigation engine 70 with data representing REF 41, which is stored in memory 75. More particularly, CMP data is mathematically cross-correlated with REF image data stored in memory 75 so as to determine the offset, in both the X and Y direction, between the first (REF) snapshot 41 and the second (CMP) snapshot 42. Many correlation methods are known to those of ordinary skill in the art of image correlation. Cross correlation calculations may be carried out in accordance with equation 1, for example, as follows:

$$C_{i,j} = \left(\frac{1}{m \cdot n}\right) \sqrt{\sum_{m=1}^{M} \sum_{n=1}^{N} (r_{m,n} - c_{m-i,n-j})^2} \quad [1]$$

where $r_{m,n}$ and $c_{m,n}$ respectively represent pixel values of the REF and CMP snapshots at point {m,n }, and i and j represent the offset between REF and CMP snapshots. The $C_{m-i,n-j}$ values are padded with zeros in regions of $r_{m,n}$ where there is no overlap.

The area of the interior surface 110 of enclosure 100 that is the subject of each snapshot is typically substantially less than the overall size (area) of the interior surface 110 of enclosure 100. As the display unit 10 moves, so does the imager 32 in relation to the interior surface 110 of enclosure 100. Thus, the scene viewed (imaged) by imager 32 also changes.

To perform the cross-correlation calculations effectively, the details of the interior surface 110 of enclosure 100 contained in the REF snapshot should have some commonality (area of commonality 45) with details of the interior surface 110 of enclosure 100 contained in the second CMP snapshot. In other words, the distance traveled by imager 32 between the point at which the REF snapshot is obtained and the point at which the CMP snapshot is obtained cannot be so great that the CMP snapshot totally lacks commonality with the REF snapshot. If this condition occurs, the display unit 10 will become "lost" or "out of bounds" in the environment. For tracking the relative position of display unit 10 to function smoothly, the CMP snapshot of the navigation surface should include at least some portion of the navigation surface details that also appear in the first REF snapshot image.

As movement of the imager 32 progresses, the overlap (or area of commonality) between the CMP and REF snapshots decreases. In the extreme case, the overlap (area of commonality) between the CMP and REF images decreases to zero, as is exemplified in FIG. 6 by REF snapshot 41 and snapshot 48. In this case, the imager 32 would become "lost" and be unable to properly report the relative position of display unit 10. However, in the present invention, as the area of commonality between the CMP snapshot and the REF snapshot decreases to a predetermined area, or percentage, of commonality (overlap), the CMP snapshot is copied into storage memory 75 and thus becomes the new REF snapshot. This procedure is called a re-referencing procedure or REREF. Immediately, subsequent to a REREF, the CMP snapshot and REF snapshot are the same, meaning that there is complete or total overlap (commonality) for cross-correlation purposes.

An alternative to the above procedure involves obtaining a cumulative snapshot of the entire interior surface 110 of enclosure 100 via taking a series of snapshots of the interior surface 110 of enclosure 100 and storing the data into memory 75. This stored data cumulatively represents the entire interior surface 110 (cumulative snapshot), or a selected portion thereof. Subsequently, as display unit 10 is moved during use, comparison snapshots (CMP) are taken of the interior surface 110 and compared with the cumulative snapshot data stored in memory 75. This alternative requires increased hardware, specifically memory to accommodate the increased snapshot data size. However, it eliminates the possibility that cross-correlation calculations cannot be carried out where the CMP snapshot shares no commonality of details with the REF snapshot (where the display unit 10 gets lost), since all details of the interior surface 110 of enclosure 100 are stored in memory 75. Interior surface 110 of enclosure 100 preferably has a cooperative texture, or pattern, along all surface areas that will be monitored by imager 32 of optical correlator 30. It should be noted, however, that the imaged surface of interior surface 110 of enclosure 100 could also have a random texture.

Figure 6:
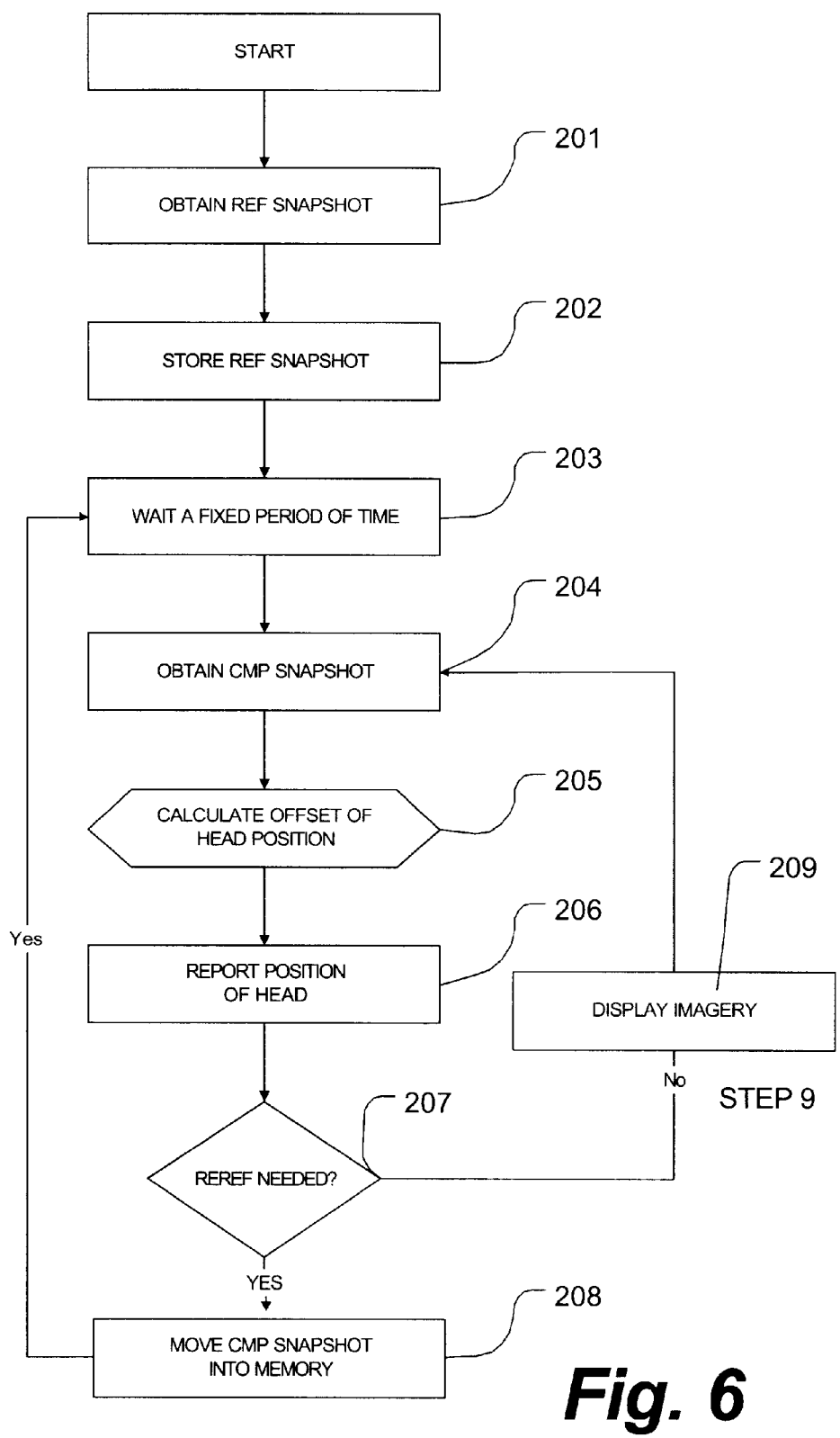
FIG. 6 is a flow chart illustrating the method of the present invention.

FIG. 6 is a flow chart illustrating the method of the present invention. A reference snapshot (REF) of interior surface 110 of enclosure 100 is obtained via imager 32 (201). The reference snapshot (REF) is stored into memory 75 (202). After a fixed period of time has elapsed (203), a comparison snapshot (CMP) of interior surface 110 of enclosure 100 is obtained via imager 32 (204). Navigation engine 70 calculates the relative position and angle of the display unit 10 via cross correlating reference snapshot (REF) with comparison snapshot (CMP) (205). The position and angle of display unit 10 is then reported to the controller 71 in accordance with the calculations of the step at 205 (206). A determination is made as to whether or not the display unit 10 has moved more than a predetermined distance (or to a point where CMP and REF snapshots share less than a predetermined area of commonality) since the reference snapshot (REF) was obtained (207). If it is determined in the step at 207 that the display unit 10 has moved more than a predetermined distance ("approaching out of bounds"), the comparison snapshot (CMP) obtained in the step at 206 is stored to memory 75 and becomes the new REF snapshot (208).

Further, the present invention provides an immersive display system which can be used to augment existing accelerometer based immersive display systems so as to more accurately establish up/down with respect to gravity and to distinguish between head motion and the motion of objects/structures in the area surrounding the user.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of the present invention and protected by the following claims.

What is claimed is:

1. A display system comprising:

a display unit comprising an optical correlator configured to optically monitor a surface and generate an image output signal in accordance therewith;

a navigation engine configured to evaluate said image output signal and a given reference snapshot to determine the position of said display unit, and to output a positional signal representative thereof;

a visual display for displaying imagery generated based upon said positional signal;

said navigation engine being configured to mathematically cross-correlate said image output signal with said reference snapshot, to determine an offset between said image output signal and said reference snapshot, and to output said positional signal to a connected system; and an omni-directional treadmill for generating an output signal in accordance with the direction and speed of a user's footsteps on the treadmill and for providing the output signal to said navigation engine.

2. A display system according to claim 1 wherein said surface comprises structures within a environment.

3. A display system according to claim 1 wherein said environment is defined by an enclosure.

4. A display system according to claim 1, wherein said connected system generates imagery for display on said visual display in accordance with said position output signal from said optical correlator and said motion output signal from said motion detection means.

5. The visual display of claim 1, further comprising:

interface means for transmitting said positional signal to the connected system.

6. A visual display according to claim 1 wherein said optical correlator comprises an imager.

7. A visual display according to claim 6, wherein said optical correlation means additionally comprises an optical system.

8. A visual display according to claim 6 wherein said imager comprises a complementary metal-oxide semiconductor (CMOS) photo imager.

9. A visual display according to claim 1 wherein said connected system comprises a simulation device.

10. A visual display according to claim 5 wherein said interface means comprises a wireless interface.

11. A visual display according to claim 10 wherein said wireless interface comprises an infrared-transmitter.

12. A visual display according to claim 1 wherein said visual display comprises a holographic display device.

* * * * *